3,047,574
2 - CYCLOHEXYL - 4 - (2 - HYDROXYETHYL) - 3-METHYLMORPHOLINE ESTERS OF SUBSTITUTED BENZOIC ACIDS
Max J. Kalm, Skokie, Ill., assignor to G. D. Searle & Co., Chicago, Ill., a corporation of Delaware
No Drawing. Filed Mar. 28, 1960, Ser. No. 17,743
11 Claims. (Cl. 260—247.2)

This invention relates to 3-alkyl-2-cycloalkyl-4-hydroxyalkylmorpholine esters of benzoic acid and its derivatives. More particularly, this invention relates to chemical compounds of the formula

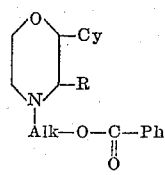

wherein Cy represents a cycloalkyl radical; R represents an alkyl radical; Alk represents an alkylene radical; and Ph represents a phenyl radical optionally substituted by halogen and/or one or more alkyl, alkoxy, nitro, amino, and/or dialkylamino radicals.

Among the cycloalkyl radicals represented by Cy, cyclohexyl radicals are of choice. The alkyl radicals represented by R are desirably lower alkyl radicals, illustratively, methyl, ethyl, propyl, isopropyl, butyl, isobutyl, sec-butyl, tert-butyl, pentyl, isopentyl, neopentyl, hexyl, isohexyl, heptyl, octyl, and isomeric groupings, among which methyl radicals are preferred. The alkylene radicals represented by Alk are bivalent saturated acyclic straight- or branched-chain hydrocarbon groupings such as methylene, trimethylene, propylene, tetramethylene, and 2,2-dimethyl-1,3-propylene, but optimally ethylene. Finally, as to Ph, it is especially advantageous that one or more identical nuclear substituents of the class described be present—in the case of alkyl, alkoxy, and dialkylamino substituents, those of lower order.

It follows that Ph is most suitably a halophenyl, polyhalophenyl, (lower alkyl)phenyl, poly(lower alkyl)phenyl, (lower alkoxy)phenyl, poly(lower alkoxy)phenyl, nitrophenyl, aminophenyl, or di(lower alkyl)aminophenyl radical. The nuclear substituents may be present in any available position or combination of positions on the benzene ring; and inasmuch as the substituted phenyl radicals referred to, like all the other chemical entities set forth herein, are unexceptionably named in accordance with recommendations of the International Union of Pure and Applied Chemistry and Chemical Abstracts (cf. specifically Section 75 of the Introduction, With Key and Discussion of the Naming of Chemical Compounds for Indexing, C.A. 39, 5867 ff., with respect to compound radical names), those skilled in the art will readily recognize that halophenyl radicals are exclusively radicals of the formula

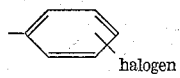
halogen polyhalophenyl radicals are exclusively radicals of the formula

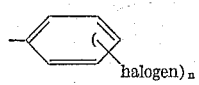
(halogen)$_n$ (lower alkyl)phenyl radicals are exclusively radicals of the formula

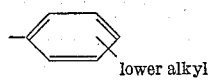
lower alkyl poly(lower alkyl)phenyl radicals are exclusively radicals of the formula

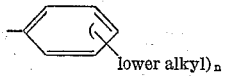
(lower alkyl)$_n$ (lower alkoxy)phenyl radicals are exclusively radicals of the formula

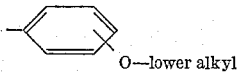
O—lower alkyl poly(lower alkoxy)phenyl radicals are exclusively radicals of the formula

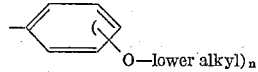
(O—lower alkyl)$_n$ nitrophenyl radicals are exclusively radicals of the formula

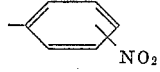
NO$_2$ aminophenyl radicals are exclusively radicals of the formula

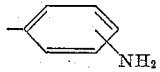
NH$_2$ and di(lower alkyl)aminophenyl radicals are exclusively radicals of the formula

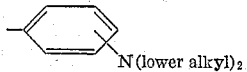
N(lower alkyl)$_2$ $n$ in each instance being a positive integer greater than 1 and less than 6.

Equivalent to the basic esters hereinbefore disclosed for the purposes of this invention are their acid-addition salts, of the formula

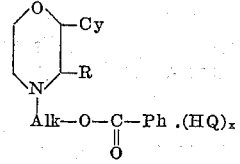

wherein Cy, R, Alk, and Ph have the meanings assigned above; Q is one equivalent of an anion—for example, chloride, bromide, iodide, nitrate, phosphate, sulfate, sulfamate, methyl sulfate, ethyl sulfate, benzenesulfonate, toluenesulfonate, acetate, lactate, succinate, malate, maleate, tartrate, citrate, gluconate, ascorbate, benzoate, cinnamate, or the like—which in combination with the cationic portion of a salt aforesaid, is neither pharmacologically nor otherwise undesirable in physiological dosage; and $x$ is 1 or more, depending upon the number of basic nitrogen atoms present and the degree of acidification.

The compounds to which this invention relates are useful because of their valuable pharmacological properties. Specifically, they are anti-fungal agents effective against such microorganisms as *Trichophyton mentagrophytes;* and moreover they favorably affect the central nervous system, for example, by suppressing appetite.

Manufacture of the basic esters hereof proceeds by heating a selected morpholine

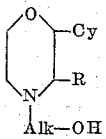

with an appropriate acid chloride

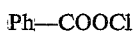

and basifying the product, Cy, R, Alk, and Ph in the foregoing formulas being defined as above. Alternatively, the acid chloride is replaced by the corresponding methyl ester

in the presence of sodium methoxide, metallic sodium, and an inert high-boiling anhydrous solvent such as xylene, Ph in the formula for the methyl ester being defined as before.

Conversion of the basic esters of this invention to their acid addition salts is accomplished by simple admixture of these compounds with one or more equivalents, respectively, of any of various inorganic and strong organic acids, the anionic portion of which conforms to Q as hereinbefore defined.

The following examples describe in detail compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

*Example 1*

A. *2-(2-cyclohexyl-3-methylmorpholino)ethyl 2-chlorobenzoate hydrochloride.*—To an anhydrous solution of 20 parts of 2-cyclohexyl-4-(2-hydroxyethyl)-3-methylmorpholine and 15 parts of methyl 2-chlorobenzoate in approximately 5400 parts of xylene is added 2 parts of sodium methoxide and a catalytic amount of metallic sodium. The resultant mixture is distilled to ⅙ its original volume, then cooled to room temperature and filtered. Following acidification with a slight excess of 25% hydrogen chloride in 2-propanol solution, 2-(2-cyclohexyl-3-methylmorpholino)ethyl 2-chlorobenzoate hydrochloride crystallizes. Recrystallization from a mixture of absolute ethanol and anhydrous ether affords the product as a white solid melting at approximately 161-162°. It has the formula

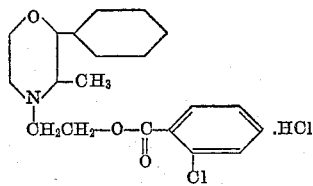

B. *2-(2-cyclohexyl-3-methylmorpholino)ethyl 2-chlorobenzoate.*—An aqueous suspension of the acid addition salt of the preceding part A of this example is made alkaline with aqueous caustic, temperatures being maintained below 20° in process. The resultant mixture is extracted with ether. The ether extract, dried over anhydrous sodium sulfate and stripped of solvent by distillation, affords 2-(2-cyclohexyl-3-methylmorpholino)-ethyl 2-chlorobenzoate as the residue.

*Example 2*

*2-(2-cyclohexyl-3-methylmorpholino)ethyl 3-chlorobenzoate hydrochloride.*—Substituting approximately 16 parts of methyl 3-chlorobenzoate for the methyl 2-chlorobenzoate called for in Example 1A, and employing 3400 parts of xylene rather than the 5400 parts there specified, one obtains, by a procedure otherwise identical, 2-(2-cyclohexyl-3-methylmorpholino)ethyl 3-chlorobenzoate hydrochloride, M.P. approximately 186-187°. The product has the formula

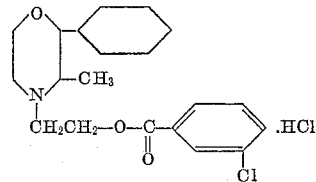

*Example 3*

*2-(2-cyclohexyl-3-methylmorpholino)ethyl 4-bromobenzoate hydrochloride.*—To an anhydrous solution of 20 parts of 2-cyclohexyl-4-(2-hydroxyethyl)-3-methylmorpholine and 19 parts of methyl 4-bromobenzoate in approximately 5400 parts of xylene is added 2 parts of sodium methoxide and a catalytic amount of metallic sodium. The resultant mixture is distilled to ⅙ its original volume, then cooled to room temperature and filtered. The filtrate is made just acid with a 25% solution of hydrogen chloride in 2-propanol, then diluted with anhydrous ether to the point of incipient turbidity and chilled. A precipitate of 2-(2-cyclohexyl-3-methylmorpholino)ethyl 4-bromobenzoate hydrochloride is thrown down. Recovered on a filter and recrystallized from a mixture of absolute ethanol and anhydrous ether, the colorless product melts at 223-225°. It has the formula

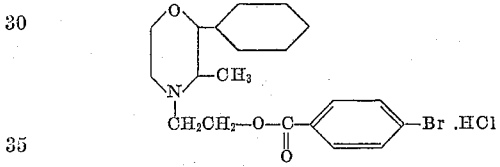

*Example 4*

*2-(2-cyclohexyl-3-methylmorpholino)ethyl 3-bromobenzoate hydrochloride.*—To an anhydrous solution of approximately 9 parts of 2-cyclohexyl-4-(2-hydroxyethyl)-3-methylmorpholine in 135 parts of benzene is slowly added approximately 9 parts of 3-bromobenzoyl chloride. The resulting solution is heated at the boiling point under reflux for 24 hours, then chilled, precipitating 2-(2-cyclohexyl-3-methylmorpholino)ethyl 3-bromobenzoate hydrochloride in process. The product, recrystallized from a mixture of absolute ethanol and anhydrous ether, is obtained in the form of a colorless solid melting at 159-162°. The product has the formula

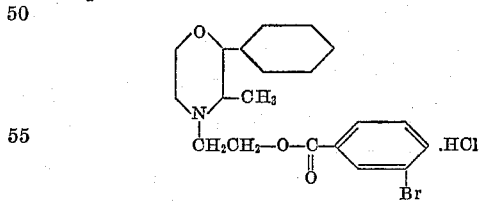

*Example 5*

*2-(2-cyclohexyl-3-methylmorpholino)ethyl 2-bromobenzoate hydrochloride.*—Substitution of approximately 18 parts of methyl 2-bromobenzoate for the methyl 4-bromobenzoate called for in Example 3 affords, by the procedure there detailed, 2-(2-cyclohexyl-3-methylmorpholino)ethyl 2-bromobenzoate hydrochloride as a white powder, M.P. 155-158°. The product has the formula

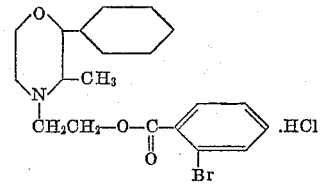

Example 6

*2 - (2-cyclohexyl-3-methylmorpholino)ethyl 4-iodobenzoate hydrochloride.*—Substitution of approximately 23 parts of methyl 4-iodobenzoate for the methyl 4-bromobenzoate called for in Example 3 affords, by the procedure there detailed, 2-(2-cyclohexyl-3-methylmorpholino)ethyl 4-iodobenzoate hydrochloride as iridescent solid melting at 224-226°. The product has the formula

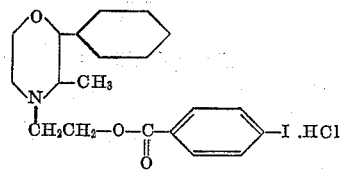

Example 7

*2-(2 - cyclohexyl-3-methylmorpholino)ethyl 2-iodobenzoate hydrochloride.*—Substitution of approximately 23 parts of 2-cyclohexyl-4-(2-hydroxyethyl)-3-methylmorpholine and approximately 26 parts of methyl 2-iodobenzoate for the 20 parts of 2-cyclohexyl-4-(2-hydroxyethyl)-3-methylmorpholine and 19 parts of methyl 4-bromobenzoate, respectively, called for in Example 3 affords, by the procedure there detailed, 2-(2-cyclohexyl-3-methylmorpholino)ethyl 2-iodobenzoate hydrochloride as a white powder melting at 144-147°. The product has the formula

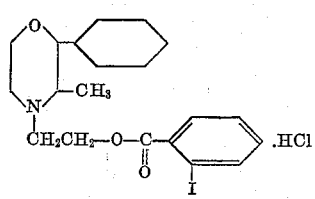

Example 8

*2-(2 - cyclohexyl-3-methylmorpholino)ethyl 2,4-dichlorobenzoate hydrochloride.*—Substitution of approximately 9 parts of 2,4-dichlorobenzoyl chloride for the 3-bromobenzoyl chloride called for in Example 4 affords, by the procedure there detailed, 2-(2-cyclohexyl-3-methylmorpholino)ethyl 2,4-dichlorobenzoate hydrochloride as white needles melting at approximately 201.0-201.3°. The product has the formula

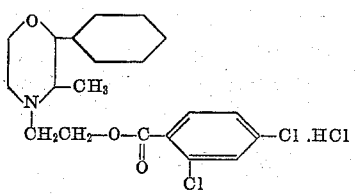

Example 9

*2 - (2 - cyclohexyl - 3 - methylmorpholino)ethyl 3,4-diiodobenzoate hydrochloride.*—Substitution of 20 parts of 3,4-diiodobenzoyl chloride for the 3-bromobenzoyl chloride called for in Example 4 affords, by the procedure there detailed, 2-(2-cyclohexyl-3-methylmorpholino)ethyl 3,4-diiodobenzoate hydrochloride, of the formula

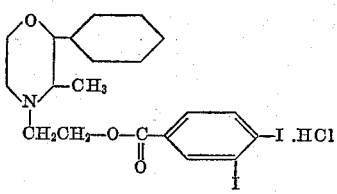

Example 10

*2-(2-cyclohexyl-3-methylmorpholino)ethyl 2,4,5-trichlorobenzoate hydrochloride.*—Substitution of approximately 10 parts of 2,4,5-trichlorobenzoyl chloride for the 3-bromobenzoyl chloride called for in Example 4 affords, by the procedure there detailed, 2-(2-cyclohexyl-3-methylmorpholino)ethyl 2,4,5-trichlorobenzoate hydrochloride, of the formula

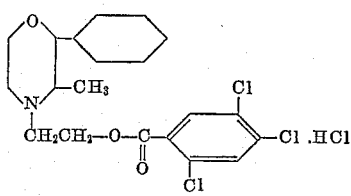

Example 11

*2-(2-cyclohexyl-3-methylmorpholino)ethyl pentachlorobenzoate hydrochloride.*—Substitution of approximately 15 parts of pentachlorobenzoyl chloride for the 3-bromobenzoyl chloride called for in Example 4 affords, by the procedure there detailed, 2-(2-cyclohexyl-3-methylmorpholino)ethyl pentachlorobenzoate hydrochloride, of the formula

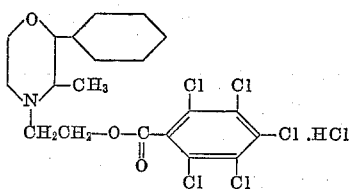

Example 12

*2-(2-cyclohexyl-3-methylmorpholino)ethyl 4-methoxybenzoate hydrochloride.*—Substituting 15 parts of 2-cyclohexyl-4-(2-hydroxyethyl)-3-methylmorpholine and approximately 11 parts of methyl 4-methoxybenzoate for the 20 parts of 2-cyclohexyl-4-(2-hydroxyethyl)-3-methylmorpholine and 19 parts of methyl 4-bromobenzoate, respectively, called for in Example 3 and employing 4000 parts of xylene rather than the 5400 parts there specified, one obtains, by a procedure otherwise identical 2-(2-cyclohexyl-3-methylmorpholino)ethyl 4-methoxybenzoate hydrochloride, M.P. approximately 194-195°. The colorless crystalline product has the formula

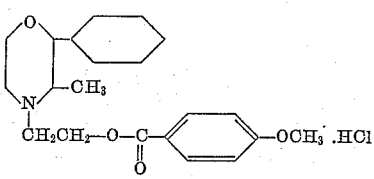

Example 13

*2-(2-cyclohexyl-3-methylmorpholino)ethyl 2-methoxybenzoate hydrochloride.*—Substitution of approximately 7 parts of 2-methoxybenzoyl chloride for the 3-bromobenzoyl chloride called for in Example 4 affords, by the procedure there detailed, 2-(2-cyclohexyl-3-methylmorpholino)ethyl 2-methoxybenzoate hydrochloride as white crystals, M.P. 171.5-174.5°. The product has the formula

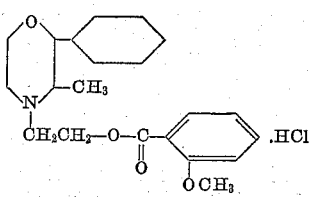

Example 14

*2-(2-cyclohexyl - 3 - methylmorpholino)ethyl 3,4,5-trimethoxybenzoate hydrochloride.*—To an anhydrous solution of 20 parts of 2-cyclohexyl-4-(2-hydroxyethyl)-3-methylmorpholine and approximately 20 parts of methyl 3,4,5-trimethoxybenzoate in approximately 4500 parts of xylene is added 2 parts of sodium methoxide and a catalytic amount of metallic sodium. The resultant mixture is distilled to ⅕ its original volume, then cooled to room temperature and filtered. The filtrate is made just acid with a 25% solution of hydrogen chloride in 2-propanol, then diluted with anhydrous ether to the point of incipient turbidity and chilled. A heavy oil is thrown down. The supernatant solvent is decanted, and the oil is taken up in absolute ethanol and precipitated with anhydrous ether to give 2-(2-cyclohexyl-3-methylmorpholino)ethyl 3,4,5-trimethoxybenzoate hydrochloride as white needles melting at 192.5–194.0°. The product has the formula

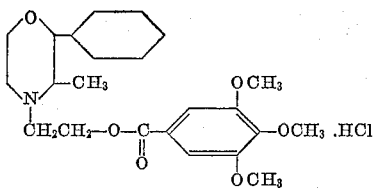

Example 15

*2-(2-cyclohexyl-3-methylmorpholino)ethyl 4-nitrobenzoate hydrochloride.*—Substitution of approximately 16 parts of methyl 4-nitrobenzoate for the methyl 4-bromobenzoate called for in Example 3 affords, by the procedure there detailed, 2-(2-cyclohexyl-3-methylmorpholino)ethyl 4-nitrobenzoate hydrochloride as a colorless solid, the melting point of which is 205–208°. The product has the formula

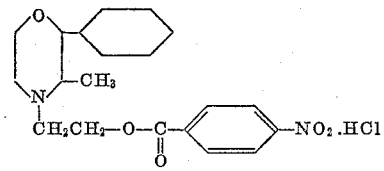

Example 16

*2-(2-cyclohexyl-3-methylmorpholino)ethyl 3-nitrobenzoate hydrochloride.*—Substitution of approximately 16 parts of methyl 3-nitrobenzoate for the methyl 4-bromobenzoate called for in Example 3 affords, by the procedure there detailed, 2-(2-cyclohexyl-3-methylmorpholino)ethyl 3-nitrobenzoate hydrochloride as colorless crystals, M.P. approximately 193–194°. The product has the formula

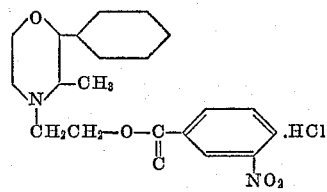

Example 17

*2-(2-cyclohexyl-3-methylmorpholino)ethyl 3-dimethylaminobenzoate dihydrobromide.*—To an anhydrous solution of 20 parts of 2-cyclohexyl-4-(2-hydroxyethyl)-3-methylmorpholine and approximately 16 parts of methyl 3-dimethylaminobenzoate in approximately 5000 parts of xylene is added 2 parts of sodium methoxide and a catalytic amount of metallic sodium. The resultant mixture is distilled to ⅙ its original volume, then cooled to room temperature and filtered. The filtrate is made just acid with a 25% solution of hydrogen bromide in 2-propanol, then diluted with anhydrous ether to the point of incipient turbidity and chilled. A heavy oil is thrown down. The supernatant solvent is decanted, and the oil is taken up in absolute ethanol and precipitated with anhydrous ether to give 2-(2-cyclohexyl-3-methylmorpholino)ethyl 3-dimethylaminobenzoate dihydrobromide as a white crystalline solid melting at 205–207° with decomposition. The product has the formula

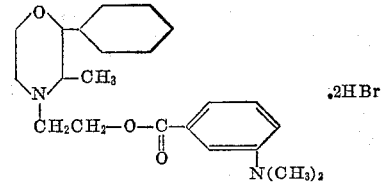

Example 18

*2 - (2 - cyclohexyl-3-methylmorpholino)ethyl 4-diethylaminobenzoate dihydrochloride.*—Substitution of approximately 18 parts of methyl 4-diethylaminobenzoate for the 4-bromobenzoate called for in Example 3 affords, by the procedure there detailed, 2-(2-cyclohexyl-3-methylmorpholino)ethyl 4-diethylaminobenzoate dihydrochloride, of the formula

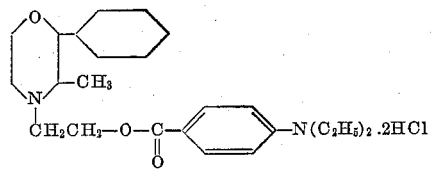

What is claimed is:
1. A compound of the formula

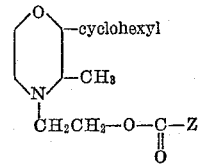

wherein Z represents a member of the group consisting of radicals of the formulas

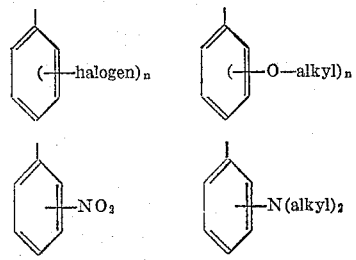

in which $n$ represents a positive integer less than 6 and the alkyl radicals called for contain fewer than 9 carbon atoms.

2. A compound of the formula

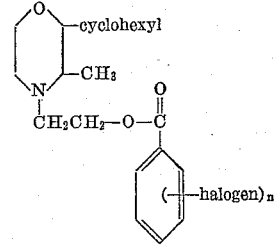

wherein $n$ represents a positive integer less than 6.

3. A compound of the formula

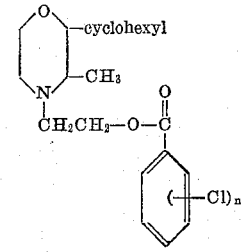

wherein *n* represents a positive integer less than 6.

4. 2-(2-cyclohexyl-3-methylmorpholino)ethyl 2-chlorobenzoate.

5. 2-(2-cyclohexyl-3-methylmorpholino)ethyl 2,4 - dichlorobenzoate.

6. A compound of the formula

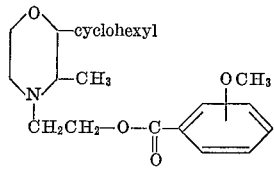

7. 2-(2-cyclohexyl-3-methylmorpholino)ethyl 4-methoxybenzoate.

8. A compound of the formula

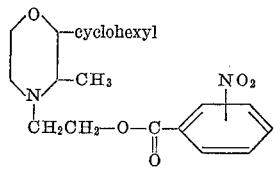

9. 2-(2-cyclohexyl-3-methylmorpholinoethyl) 4-nitrobenzoate.

10. A compound of the formula

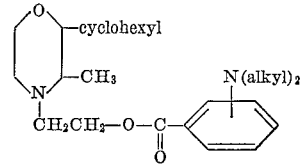

wherein the alkyl radicals called for contain fewer than 9 carbon atoms.

11. 2-(2-cyclohexyl-3-methylmorpholino)ethyl 3 - dimethylaminobenzoate.

References Cited in the file of this patent
UNITED STATES PATENTS

| | | |
|---|---|---|
| 2,782,112 | Gilbert et al. | Feb. 19, 1957 |
| 2,868,786 | Siemer et al. | Jan. 13, 1959 |
| 2,956,081 | Kusserow et al. | Oct. 11, 1960 |